GATED MULTIAR WITH TEMPERATURE COMPENSATING MEANS

Filed Oct. 18, 1960

INVENTOR
SVERRE GEORGE SEM-SANDBERG
BY Haane and Nydick
ATTORNEYS

United States Patent Office 3,080,488

Patented Mar. 5, 1963

3,080,488

GATED MULTIAR WITH TEMPERATURE COMPENSATING MEANS

Sverre George Sem-Sandberg, Vendelso, Sweden, assignor to Telefonaktiebolaget L M Ericsson, Stockholm, Sweden, a corporation of Sweden Filed Oct. 18, 1960, Ser. No. 63,408
Claims priority, application Sweden Sept. 13, 1960
1 Claim. (Cl. 307—88.5)

The present invention refers to a comparison circuit or a discriminator for comparing a varying potential with a reference potential and depending on the result of the comparison to produce a signal if the first mentioned potential is equal to or exceeds the value of the reference potential in an arbitrary moment.

In devices for comparing potentials, for example certain types of analog-digital converters, a comparing circuit is necessary to indicate that the potential which has to be expressed in digit values is greater than or equal to a predetermined value. In certain types of coders for pulse-code-modulation it is necessary to obtain an indication when two potential values are equal. In all cases a great precision is necessary in the comparison and the error has to be less than the half of the smallest value which can be registered.

Previously known comparing circuits are not sufficiently sensitive and fast and their temperature dependence is too great. The object of the invention is to obtain a comparison circuit which is free from the mentioned drawbacks. The comparison circuit according to the invention is substantially characterized by the fact that it comprises a regenerative amplifier with a transistor or similar element and a transformer which causes positive feed-back, and furthermore comprises a non-linear element, for example a diode, on one hand constituting part of a circuit which comprises the diode formed by the base and the emitter of the transistor in series with the source of a reference potential with such a direction that said base-emitter diode normally is maintained blocked, on the other hand said diode constituting part of another circuit which comprises the source of the varying potential with such a direction that said non-linear element will be conducting upon the occurrence of the varying potential, said non-linear element at its cathode terminal being connected to a source of control pulses, having such polarity that upon the occurrence of a pulse the non-linear element will be blocked so that said base-emitter diode can be conducting if the absolute value of the varying potential occurring at the anode terminal of the non-linear element is greater than or equal to the magnitude of the reference potential causing the occurrence of a pulse at the output of the regenerative circuit.

Figure 1:
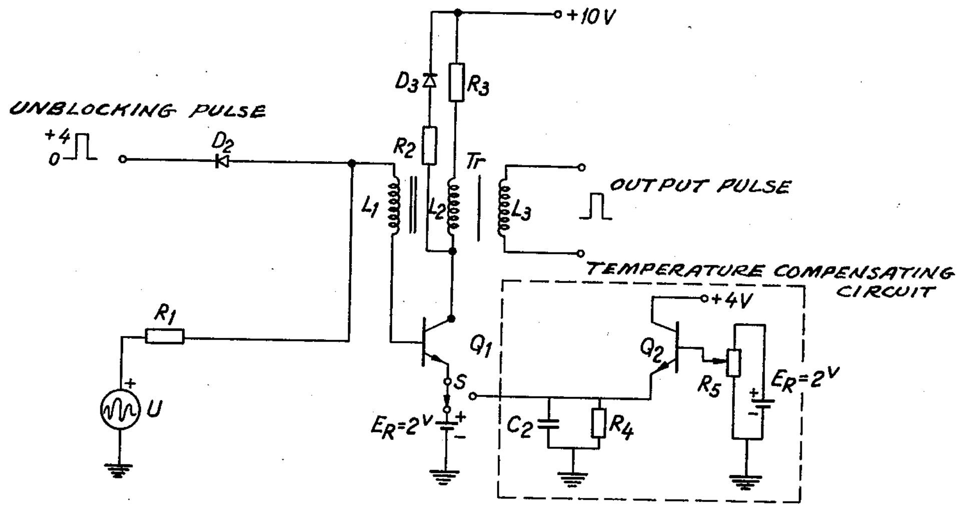
Figures 2A, 2B:
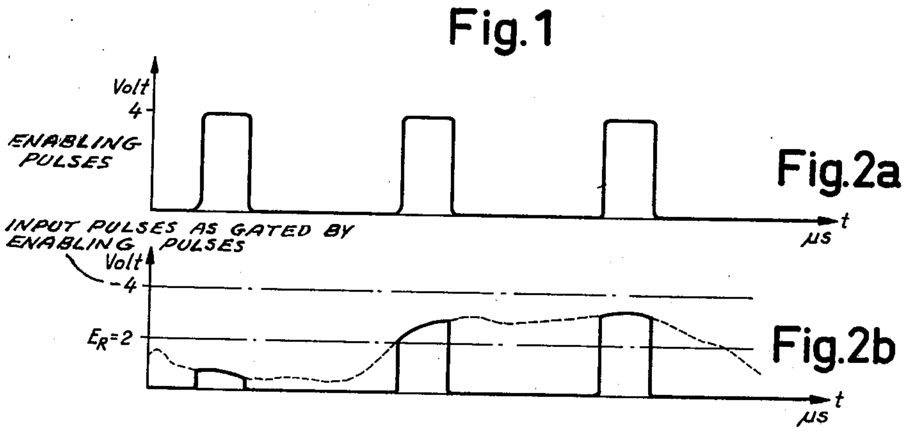
Figure 2C:
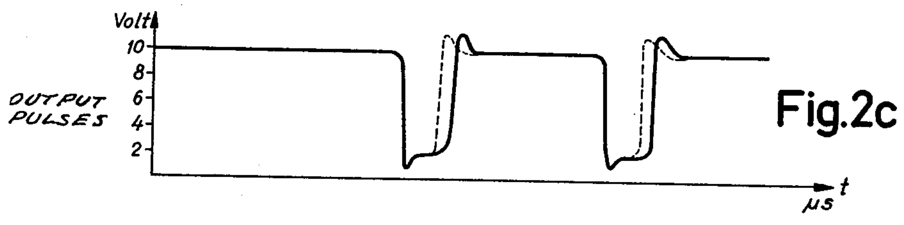

The invention will be explained more in detail by means of an embodiment with reference to the enclosed drawing. FIG. 1 shows the comparison circuit according to the invention. FIG. 2*a* shows the time function of the controlling pulses, FIG. 2*b* shows the varying potential and FIG. 2*c* shows the pulses obtained at the output as a function of the time.

In FIG. 1 Q1 designates a transistor of NPN-type forming together with a transformer *Tr* a regenerative circuit which, when the transistor is deblocked, in known manner by a cumulative process produces a steeply rising collector current which upon reaching a maximum value defined by the characteristic of the transistor, returns to the initial value. Besides its two windings L1 and L2 arranged to provide positive feed-back the transformer has a third winding L3 in which upon a current change in the collector circuit, a potential pulse arises which is fed to an output. The transistor Q1 is normally blocked as its emitter is connected to the positive pole of a potential source $E_R$ and its base is connected to earth. The potential $E_R$ is the reference potential with which a varying potential U is to be compared. A rectifier D2 is connected in series with the base of the transistor and it has its cathode terminal connected to earth and its anode terminal connected to the source of the varying potential U. Thus upon deviation of said potential from 0-value a current will pass always through the diode D2 whereby the anode terminal of the diode and consequently the base of the transistor will be maintained at 0-potential and the transistor will be maintained blocked independently of the value of the varying potential. If now to the cathode terminal of the rectifier D2 a controlling pulse is fed, the diode will be blocked and its anode terminal which is connected to the base obtains the same potential as the varying potential. FIG. 2*a* shows the process of the controlling pulses. It should be evident that in the case when the varying potential on the base of the transistor is equal to or greater than the reference potential $E_R$, the transistor becomes conducting and the earlier mentioned cumulative process begins. FIG. 2*b* shows the variations of the base potential as a function of time if the value of the varying potential is 0. As shown, a potential differing from 0 can occur on the base only during the controlling pulses while between said pulses the potential is 0 owing to the fact that the diode D2 connects the base directly to earth. The condition that a pulse should be obtained from the terminals of the winding L3 is however also that the varying potential should be greater than or equal to the reference potential $E_R$ during a controlling pulse as shown in FIG. 2*b*. If said condition is fulfilled, the regenerative process will begin. Evidently the amplitude of the controlling pulse has to be greater than the greatest value of the varying potential as in the other case a potential exceeding the pulse amplitude, would open the diode again and would block the transistor. FIG. 2*c* shows the process of the pulses obtained from the winding L3. As is seen, during the first pulse in FIG. 2*a* no current is obtained through the collector circuit as the varying potential does not exceed the value of the reference potential during said time. On the other hand a current is obtained during the second and the third pulse when the varying potential exceeds the reference value. As is easy to understand, the length of the controlling pulse and the time of the regenerative process have not necessarily to correspond to each other. If the last mentioned is longer than a controlling pulse, the length of the pulse obtained at the output will of course be defined by the controlling pulse as is clear from the above mentioned. If however the time of the regenerative process would be shorter, the pulse shown in FIG. 2*c* by dotted lines will be obtained at the output.

In order to prevent that the base-emitter potential of the transistor Q1 which depends on the temperature and can be about —2.5 mv./° C. influences the measuring result erroneously, it is possible according to the invention to use a temperature compensating device TK shown in FIG. 1. For the sake of simplicity a switching contact S is shown which symbolizes that the device according to FIG. 1 can alternatively be connected to the reference potential $E_R$ directly or to the temperature compensating device TK. This last mentioned device comprises a transistor Q2 identical with the transistor Q1, contrary to Q1 conducting in resting condition. Its base is connected to the reference potential and its emitter is connected to the emitter of Q1. A capacitor C2 is connected between said connection and earth, said capacitor being maintained charged by the transistor Q2 to a potential varying with the temperature depending base-emitter potential in Q2. Due to the fact that the diodes formed by the base and the emitter in the two transistors are directed opposite, a potential change substantially equal through the first transistor and in the second transistor is obtained but with opposite sign so that a temperature compensation occurs.

Besides the stability of temperature further advantages have been obtained. By moving the source $E_R$ of reference potential to the base circuit Q2 the potential source will not be as hardly loaded as upon connection directly to the base of the transistor Q1. Owing to the impedance transformation between the base and emitter circuits in Q2, the impedance of the source will be less critical. In this manner the value of $E_R$ can be adjusted by using a suitable potentiometer.

I claim:

A comparison circuit for comparing a varying potential with a reference potential, said comparison circuit comprising regenerative amplifying means including a transistor having a base electrode, a collector electrode and an emitter electrode, and a transformer, a primary winding of said transformer being connected to the collector electrode of said transistor and a secondary winding to one of the two other electrodes of said transistor so as to cause, due to feedback, an amplified output signal responsive to an input signal, a second transistor having a base electrode, a collector electrode and an emitter electrode, the emitter electrode of the first transistor being connected to the emitter electrode of the second transistor, the base electrode of said second transistor being connected to said reference potential whereby temperature-caused variations of the base-emitter potential of said first transistor are compensated by corresponding opposite variations of the base-emitter potential in the second transistor, a first input for supplying said varying potential to the base of said first transistor, and a second input supplied by a direct potential and by controlling pulses respectively, said direct potential blocking the first transistor when being supplied to the base electrode thereof, said second input including normally conducting diode means so as to connect said direct potential to said base electrode, said amplified output pulses being produced when said control pulses are fed to said first input at the same time as the relative value of the varying potential on the base and of the reference potential on the emitter electrode of the first transmitter allows a conducting state of said transistor.

References Cited in the file of this patent

UNITED STATES PATENTS

| | | |
|---|---|---|
| 2,872,596 | Day et al. | Feb. 3, 1959 |
| 2,933,689 | Johnson | Apr. 19, 1960 |
| 2,964,651 | Thomas | Dec. 13, 1960 |